United States Patent
Cote (10) Patent No.: US 7,542,909 B2
(45) Date of Patent: Jun. 2, 2009

(54) METHOD, SYSTEM, AND APPARATUS FOR REPAIRING AUDIO RECORDINGS

(75) Inventor: William F. Cote, Carlisle, MA (US)

(73) Assignee: Dictaphone Corporation, Stratford, CT (US)

( * ) Notice: Subject to any disclaimer, the term of this patent is extended or adjusted under 35 U.S.C. 154(b) by 709 days.

(21) Appl. No.: 10/951,281

(22) Filed: Sep. 27, 2004

(65) Prior Publication Data

US 2005/0207541 A1  Sep. 22, 2005

Related U.S. Application Data (60) Provisional application No. 60/506,762, filed on Sep. 30, 2003.

(51) Int. Cl.
*G10L 11/00* (2006.01)
*G10L 21/00* (2006.01)
*H04M 1/64* (2006.01)
*H04M 3/42* (2006.01)

(52) U.S. Cl. ............... 704/278; 379/88.17; 379/213.01; 704/270; 704/277

(58) Field of Classification Search .................. 704/278
See application file for complete search history.

(56) References Cited

U.S. PATENT DOCUMENTS

| | | | |
|---|---|---|---|
| 4,477,698 A | 10/1984 | Szlam et al. | |
| 4,696,029 A * | 9/1987 | Cohen | 379/112.04 |
| 4,965,763 A | 10/1990 | Zamora | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | 707/1 |
| 5,664,109 A | 9/1997 | Johnson et al. | 705/2 |
| 5,799,268 A | 8/1998 | Boguraev | 704/9 |
| 5,809,476 A | 9/1998 | Ryan | |
| 5,832,450 A | 11/1998 | Myers et al. | 705/3 |
| 5,970,463 A | 10/1999 | Cave et al. | |
| 6,014,663 A | 1/2000 | Rivette et al. | 707/4 |
| 6,021,202 A | 2/2000 | Anderson et al. | |
| 6,052,693 A | 4/2000 | Smith et al. | 707/104.1 |
| 6,055,494 A | 4/2000 | Friedman | 704/9 |
| 6,088,437 A | 7/2000 | Amick | |
| 6,182,029 B1 | 1/2001 | Friedman | 704/9 |
| 6,192,112 B1 | 2/2001 | Rapaport et al. | |

(Continued)

OTHER PUBLICATIONS

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).

(Continued)

*Primary Examiner*—David R Hudspeth
*Assistant Examiner*—Justin W Rider
(74) *Attorney, Agent, or Firm*—Kelley Drye & Warren LLP (57) ABSTRACT

A system and method is disclosed for detecting and repairing audio recordings that contain busy signals and extended periods of silence by searching for clusters of silence by reviewing the amplitude in an audio recording sample and listing each silence and sample time.

6 Claims, 10 Drawing Sheets

U.S. PATENT DOCUMENTS

| | | | |
|---|---|---|---|
| 6,243,444 B1* | 6/2001 | O'Neal | 379/88.17 |
| 6,292,771 B1 | 9/2001 | Haug et al. | |
| 6,347,329 B1 | 2/2002 | Evans | |
| 6,405,165 B1 | 6/2002 | Blum et al. | |
| 6,434,547 B1* | 8/2002 | Mishelevich et al. | 703/3 |
| 6,438,533 B1 | 8/2002 | Spackman et al. | |
| 6,553,385 B2 | 4/2003 | Johnson et al. | 707/104.1 |
| 6,915,254 B1 | 7/2005 | Heinze et al. | 704/9 |
| 6,947,936 B1 | 9/2005 | Suermondt et al. | 707/7 |
| 7,124,144 B2 | 10/2006 | Christianson et al. | 707/102 |
| 2002/0007285 A1 | 1/2002 | Rappaport | 705/2 |
| 2002/0095313 A1 | 7/2002 | Haq | 705/2 |
| 2002/0143524 A1 | 10/2002 | Lee et al. | 707/523 |
| 2002/0169764 A1 | 11/2002 | Kincaid et al. | 703/3 |
| 2003/0046264 A1 | 3/2003 | Kauffman | 707/1 |
| 2003/0061201 A1 | 3/2003 | Grefenstette et al. | 707/3 |
| 2003/0088403 A1* | 5/2003 | Chan et al. | 704/213 |
| 2003/0115080 A1 | 6/2003 | Kasravi et al. | 705/1 |
| 2003/0208382 A1 | 11/2003 | Westfall | 705/3 |
| 2003/0233345 A1 | 12/2003 | Perisic et al. | 707/3 |
| 2004/0103075 A1 | 5/2004 | Kim et al. | 707/1 |
| 2004/0139400 A1 | 7/2004 | Allam et al. | 715/526 |
| 2004/0186746 A1 | 9/2004 | Angst et al. | 705/3 |
| 2004/0220895 A1 | 11/2004 | Carus et al. | |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0108010 A1 | 5/2005 | Frankel et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |

OTHER PUBLICATIONS

"Customizing D/41 Call Analysis," date unknown, Intel Corp., Santa Clara, California, available at http://resource.intel.com/telecom/support/appnotes/custd41d.htm (last accessed Jul. 25, 2005).
U.S. Appl. No. 11/068,493, Carus et al.
U.S. Appl. No. 10/953,471, Cote et al.
U.S. Appl. No. 11/069,203, Cote et al.
U.S. Appl. No. 11/007,626, Cote et al.
U.S. Appl. No. 10/840,428, Carus et al.
F. Song et al., A Graphical Interface to a Semantic Medical Information System, *Journal of Foundations of Computing and Decision Sciences*, 22(2), 1997.
F. Song et al., A Cognitive Model for the Implementation of Medical Problem Lists, *Proceedings of the First Congress on Computational Medicine, Public Health and Biotechnology*, Austin, Texas, 1994.
F. Song et al., A Graphical Interface to Semantic Medical Information System, Karp-95 Proceedings of the Second International Symposium on Knowledge Acquisition, Representation and Processing, pp. 107-109, 1995.
Epic Web Training Manual, pp. 1-33, 2002.
B. Hieb, Research Note, NLP Basics for Healthcare, August 16, 2002.
C. Shalizi et al., Pattern Discovery in Time Series, Part I: Theory, Algorithm, Analysis, and Convergence, Journal of Machine Leaning Research ? (2002) ?-? Submitted Oct. 28, 2002; Published ?/2002.
C. Nevill-Manning et al., The Development of Holte's 1R Classifier, Department of Computer Science, 1995.
D. Cutting et al., A Practical Part-of-Speech Tagger, Xerox Palo Alto Research Center, 1992.
J. Zavrel et al., Recent Advances in Memory-Based Part-of-Speech Tagging, ILK/Computational Linguistics, 1999.
E. Brill, Some Advances in Transformation-Based Part of Speech Tagging, Spoken Language Systems Group, 1994.
J. Nivre, DAC723: Language Technology Finite State Morphology, Vaxjo University of Mathematics and Systems Engineering, p. 1/11. Receipt est. Mar. 19, 2004.

M. Creutz, Morphology and Finite-State Transducers, Oct. 31, 2001, Chap 3, Jurafsky & Martin.
http://www.comp.lancs.ac.uk/computing/research/stemming/general/index.htm printed Jul. 19, 2004.
http://www.comp.lancs.ac.uk/computing/research/stemming/general/stemmingerrors.htm printed Jul. 19, 2004.
http://www.comp.lancs.ac.uk/computing/research/stemming/general/performance.htm printed Jul. 19, 2004.
M. Lee et al., Cleansing Data for Mining and Warehousing, Lecture Notes in Computer Science vol. 1677 archive, Proceedings of the 10th International Conference on Database and Expert Systems Applications, pp. 751-760, Springer-Verlag, London, 1999.
C. Van Rijsbergen, Information Retrieval, 2nd Ed., Ch. 5, Butterworths, London, 1979.
J. Day, Extracting Knowledge from Text Using Learning by Constraint Relaxation (LCR), CSI, www.csi-inc.com/CSI/pdf/jday_icim02.pdf, Receipt est. Mar. 19, 2004.
W. Gale et al., Discrimination Decisions for 100,000-Dimensional Spaces, Current Issues in Computational Linguistics, pp. 429-450, Kluwer Academic Publishers, 1994.
W. Daelemans et al., TiMBL: Tilburg Memory Based Learner, version 5.0, Reference Guide, ILK Research Group Technical Report Series No. 04-02 (ILK-0402), ILK Research Group, Tilburg University, Tilburg, Netherlands, 2004.
Case Study: Massachusetts Medical Society.
Case Study: Massachussetts Medical Society http://www.microsoft.com/resources/casestudies/CaseStudy.asp?CaseStudyID=14931 posted Jan. 13, 2004.
W. Braithwaite, Continuity of Care Record (CCR) http://www.hl7.org/library/himss/2004Orlando/ContinuityofCareRecord.pdf.
C. Waegemann, *EHR* vs. *CCR*: What is the difference between the electronic health record and the continuity of care record?, Medical Records Institute, 2004.
Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.
Work Item Summary: WK4363 Standard Specification for the Continuity of Care Record (CCR), http://www.astm.org/cqi-bin/SoftCart.exe/DATABASE.CART/WORKITEMS/WK4363.htm?E+mystore Mar. 3, 2004.
Continuity of Care Record (CCR): The Concept Paper of the CCR, v. 2. 1b, http://www.bhtinfo.com/CCR.Concept%20Paper.1.5.doc.
Continuity of Care Record, American Academy of Family Physicians, http://www.aafp.org/x24962.xml?printxml posted Nov. 12, 2003.
Continuity of Care Record (CCR), AAFP Center for Health Information Technology, http://www.centerforhit.org/x201.xml posted Aug. 20, 2004.
Core Measures web page, Joint Commission on Accreditation of Healthcare Organizations, http://www.jcaho.org/pms/core+measures/ printed Mar. 22, 2004.
Specifications Manual for National Implementation of Hospital Core Measures, v. 2.0, Joint Commission on Accreditation of Healthcare Organizations, http://www.jcaho.org/pms/core+measures/information+on+final+specifications.htm.
Code Information and Education web page, American Medical Association, http://www.ama-assn.org/ama/pub/category/3884.html printed Mar. 22, 2004.
Category III CPT Codes, American Medical Association, http://www.ama-assn.org/ama/pub/article/3885-4897.html printed Mar. 22, 2004.
ICD-9-CM Preface (FY04), http://ftp.cdc.gov/pub/Health_Statistics/NCHS/Publications/ICD9-CM/2004/Prefac05.RTF.
ICD-9-CM Official Guidelines For Coding and Reporting, effective Oct. 1, 2003.
Q. X. Yang et al., "Faster algorithm of string comparison," Pattern Analysis and Applications, vol. 6, No. 1, Apr. 2003: pp. 122-133.

\* cited by examiner

METHOD, SYSTEM, AND APPARATUS FOR REPAIRING AUDIO RECORDINGS

CROSS-REFERENCE TO RELATED APPLICATIONS

This application claims the benefit of priority of U.S. Provisional Patent Application Ser. No. 60/506,762, entitled "METHOD, SYSTEM AND APPARATUS FOR REPAIRING AUDIO RECORDING," filed Sep. 30, 2003, which is hereby incorporated by reference in its entirety. This application relates to co-pending U.S. patent application Ser. No. 10/447,290, entitled "SYSTEM AND METHODS UTILIZING NATURAL LANGUAGE PATIENT RECORDS," filed on May 29, 2003; co-pending U.S. patent application Ser. No. 10/413,405, entitled "SYSTEMS AND METHODS FOR CODING INFORMATION," filed April 15, 2003; co-pending U.S. patent application Ser. No. 11/068,493, entitled "A SYSTEM AND METHOD FOR NORMALIZATION OF A STRING OF WORDS," filed on Feb. 28, 2005; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/787,889, entitled "SYSTEM, METHOD AND APPARATUS FOR PREDICTION USING MINIMAL AFFIX PATTERNS," filed on Feb. 27, 2004; co-pending U.S. patent application Ser. No. 10/448,317, entitled "METHOD, SYSTEM, AND APPARATUS FOR VALIDATION," filed on May 30, 2003; co-pending U.S. patent application Ser. No. 10/448,325, entitled "METHOD, SYSTEM, AND APPARATUS FOR VIEWING DATA," filed on May 30, 2003; co-pending U.S. patent application Ser. No. 10/953,448, entitled "SYSTEM AND METHOD FOR DOCUMENT SECTION SEGMENTATIONS," filed on Sep. 30, 2004; co-pending U.S. patent application Ser. No. 10/953,471, entitled "SYSTEM AND METHOD FOR MODIFYING A LANGUAGE MODEL AND POST-PROCESSOR 1NFORMATION," filed on Sep. 29, 2004; co-pending U.S. patent application Ser No. 10/951,291, entitled "SYSTEM AND METHOD FOR CUSTOMIZING SPEECH RECOGNITION INPUT AND OUTPUT," filed on Sep. 27, 2004; co-pending U.S. patent application Ser No. 10/953,474, entitled "SYSTEM AND METHOD FOR POST PROCESSING SPEECH RECOGNITION OUTPUT," filed on Sep. 29, 2004; co-pending U.S. patent application Ser. No. 11/069,203, entitled "SYSTEM AND METHOD FOR GENERATING A PHASE PRONUNCIATION," filed on Feb. 28, 2005; co-pending U.S. patent application Ser. No. 11/007,626, entitled "SYSTEM AND METHOD FOR ACCENTED MODIFICATION OF A LANGUAGE MODEL," filed on Dec. 7,2004; co-pending U.S. patent application Ser. No. 10/948,625, entitled "METHOD, SYSTEM, AND APPARATUS FOR ASSEMBLY, TRANSPORT AND DISPLAY OF CLINICAL DATA," filed on Sep. 23, 2004; and co-pending U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, all which are hereby incorporated by reference in their entirety.

BACKGROUND OF THE INVENTION

In modern medical practices physicians often dictate medical reports into a telephone transcription center. As a physician dictates a report via telephone into the transcription center the report is recorded into an audio file, typically in digital format, and stored into a database. The transcription center will stop recording audio when it receives a hang up signal from the telephone system. The recorded audio file is then accessed either by a manual transcriptionist for transcribing, or more recently, the audio file is processed by a speech recognition engine. In the latter case, the speech recognition engine processes the audio into text and prepares a written report of the original dictated report.

It has been found that the transcription center will sometimes continue to record audio even after the physician has completed the dictation and hung up the telephone. In these cases the transcription center does not recognize a hang up signal from the telephone system or the telephone fails to immediately send a hang up signal and close the telephone line. This results in audio files recorded at the transcription center that often include anomaly portions, e.g. include hang up sounds, busy signals, fast busy signals and extended superfluous "dead" air portions. It is not uncommon for audio files to contain a limited amount of actual valuable audio, i.e., medical dictation, and a substantial portion of anomaly signals. In some cases it has been found that the anomaly portion of any particular audio file can be up to and even more than ten minutes in length.

Audio files containing anomalies can waste valuable database, transcriptionist and overall transcription system resources. Further, such audio files have been known to crash speech recognition engines as well as providing poor samples for acoustic signatures for a particular physician during speech recognition engine training.

Various systems have been implemented to solve this problem. For example there are systems which detect of a busy signals, however such system tend to run to run Fast Fourier Transform ("FFT") or some of kind of signal detection, it might be a little slow to do that or you need special hardware to do that. It is desirable to provide a system that performs the searching and detection of anomalies in sound recordings in fast and efficient manner and without the need for additional expensive software or hardware.

SUMMARY OF THE INVENTION

The present invention includes a system and method for detecting and repairing audio recordings that contain busy signals and extended periods of silence by searching for clusters of silence by reviewing the amplitude in an audio recording sample and listing each silence and sample time.

In a first aspect, the present invention includes a method for detecting and repairing audio recordings, where the method includes comprising detecting an anomaly in the audio recording, detecting at least one silence in the audio recording, determining the length of the at least one silence, detecting a busy signal in the audio recording, and identifying the detected busy signal. In some embodiments the present invention includes identifying fast or slow busy signals or identifying the rate of the busy signals, where in some embodiments a rate of X equal fast and a rate of Y equals slow.

The present invention may also include the steps of detecting a final silence and detecting a hang-up silence. In some embodiment detecting a hang-up silence may include the step of determining the location of said Hang-up silence in the audio recording or determining the location of the hang-up silence by subtracting the length of the detected busy signal from the location of the first inter-busy signal.

In a second aspect, the present invention includes a method for fixing busy signals found in an audio recording, where the method includes the steps of determining whether said busy signal is fixable, determining whether fast busy signal equals a pre-determined value X, determining whether slow busy signal equals a pre-determined value Y, determining whether hang-up silence equals a pre-determined value Z, determining whether Final silence equals a pre-determined value XX, determining spacing between said fast busy signal and slow busy signal and determining spacing between fast busy signal and final silence. In some embodiments X, Y, Z and XX have the following values: X=1; Y=1; Z=1; and XX=1.

In a third aspect, the present invention includes a method for fixing silences located in an audio recording, the method including the steps of determining whether a silence is fixable, determining whether fast busy signal equals a pre-determined value X, determining whether slow busy signal equals a pre-determined value Y, determining whether hang-up silence equals a pre-determined value Z, determining whether Final silence equals a pre-determined value XX determining spacing between said fast busy signal and slow busy signal, and determining spacing between fast busy signal and final silence In some embodiments X, Y, Z and XX have the following values: X=0; Y=0; Z=0; and XX=1.

In a fourth aspect, the present invention includes a method for identifying a busy signal or a final silence, the method including the steps of determining whether said busies or final silence exist, determining whether fast busy signal equals a pre-determined value X, determining whether slow busy signal equals a pre-determined value Y, determining whether hang-up silence equals a pre-determined value Z, determining whether Final silence equals a pre-determined value XX, determining spacing between said fast busy signal and slow busy signal, and determining spacing between fast busy signal and final silence. In some embodiments X, Y, Z and XX have the following values: X>O OR Y>0; Z=1; and XX>0.

In a fifth aspect, the present invention includes a method for fixing anomalies such as busy and fixing silence routines, in audio recordings, where the method includes the steps of truncating said audio recording at pre-determined anomaly point and outputting said truncated audio recording. In some embodiments the truncating step includes an anomaly point equal to the hang-up point or an anomaly point equal to the first silence point. IN some embodiment the truncated audio recording is output to a speech recognition engine.

In a sixth aspect, the present invention includes a computer apparatus structured and arranged to detect and repair audio recordings that contain busy signals and extended periods of silence by searching for clusters of silence by reviewing the amplitude in an audio recording sample and listing each silence and sample time.

The above advantages and features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE PREFERRED EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In practicing the invention audio recordings in the form of digitized samples may be analyzed in certain predetermined amount so time, for example, every 10-100 milliseconds. Each sample may be analyzed to determine the amplitude and to search for strings or series of amplitudes or that are very near to zero. A first review of the samples may search for clusters of silence in the audio recording data where certain speech signals can be located along with associated gaps therein. A list or index may be prepared identifying the location of non-silence and silences in the speech, along with the time period and number of each. In some embodiments, certain pre-determined minimum and maximum lengths of non-silence and/or silences can be set so that non-silences and silences in speech outside the pre-determined lengths can be bypassed during the search.

As an example, busy signal located within an audio recording will likely be characterized as a very regular series of silences. Such an example is easily identifiable as a slow busy signal by locating a series of silences having a pre-determined amount of samples in length. A fast busy signal may be identified by locating a silence period in between the individual signals of the fast busy signals. By using such exemplary criteria it may be possible to locate repeated periods of silences, which periods of silence may have a pre-determined regular length as well. Using the above described exemplary steps it is possible to determine where a fast busy signal is located within an audio file apart from the location of a slow busy signal. It is further possible by use of the present invention to determine the presence of a sequence of a particular pattern in each of the slow busy and fast busy signals as well as mixed patterns including alternating fast and slow busy signals. Such determinations may provide easily obtainable locations for possible truncation points in the audio file and repair the audio file for speech recognition processes.

In utilizing the present invention it is essential that you obtain an audio recording. An audio in digital format is preferable, but not critical. There are embodiment of the present invention that may be implement for use with analog recordings. Also preferable is a recording that is encoded with certain pre-determined characteristics of busy signals. The invention is designed for US versions of PBX and telephone systems the present invention may be implement for other non U.S. telephone systems, such as European systems where the duration of certain busy signals is different than in standard U.S. practice.

Figure 1:
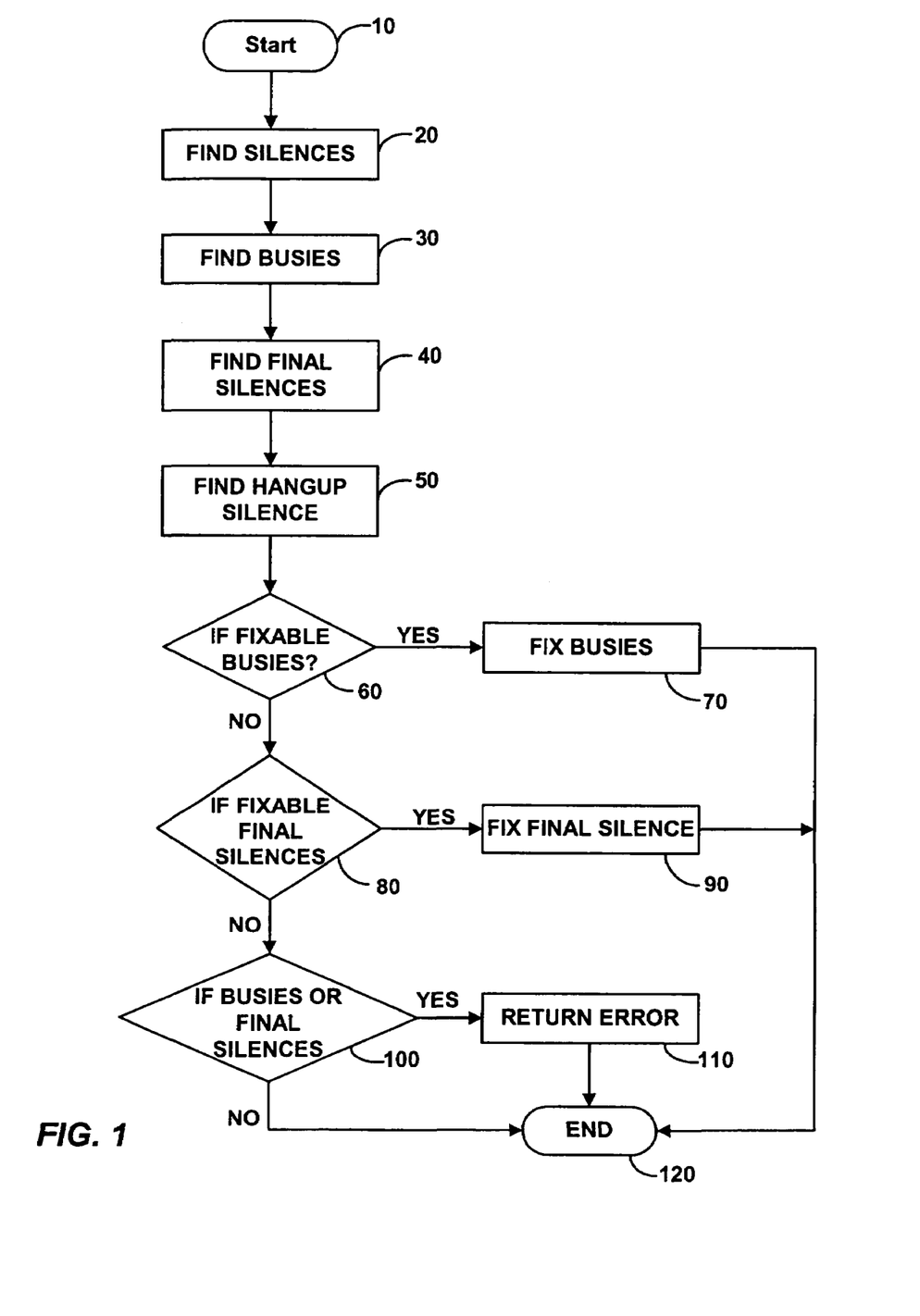
FIG. 1 is flow diagram of the method according to the invention.

Turning now to FIG. 1 there is shown a flow diagram of the overall system architecture according to one embodiment of the present invention. The present invention may include a sequence of computations designed to find and repair busy signals or other anomalies in an audio recording. The system starts at box 10 and at box 20 runs a code (described below) to locate silences in the audio file. The search is conducted for runs of both relative silence and runs of absolute silence. The thresholds may be set at different pre-determined levels in order to identify a particular type of silence. The system in box 20 attempts to identify strings of absolute silence and relative silence.

The system in box 30 identifies strings of busy signals (described below). The search determines the lengths of silences and determines the location of and length of such silences for comparison against a pre-determined amount of time (or length). An example of a code for searching samples is around amplitude of 0 to identify silences and to search for lengths of silences the code is around 50 samples of silence. In box 30 the system identifies a busy signal period determining the locations of strings of silences that are about the same length. Alternatively, the search may be conducted for strings in the relative silence. Also, alternatively, if busy signals are not located, the absolute silences may be strings searched for of silences. The location of any strings of silences at or near the same length may indicate the location of data in the audio recording which may be truncated at the end of the process.

In box 40 the system determines the location of a specified period, likely at the end or near the end of the audio file, which is at or near absolute silence.

In box section 50, the system determines the location of the final hang-up silence. The hang-up silence is the silence period just after the call is terminated and just before the first busy signal starts. Since this system locates the first of the evenly spaced silence periods in between the busy signal tones, the system looks for the short silence period starting one evenly spaced period before the first silence period.

In box 60 the system determines whether any busy signal identified is fixable. In some embodiments, if a slow busy is found, a fast busy is found, a hang-up silence is found, and a final silence is found, and there is a certain ordering of the events, then the busy signal is determined to be fixable.

If the busy is determined as a fixable busy signal, then the system attempts to fix the audio recording by properly truncating the audio recording at a pre-determined location (discussed below) in box 70. In determining whether a signal is fixable, a sequence of experienced events in the recording is compared a set of pre-determined events. For example, if the system determines a slow busy signal followed directly by a fast busy signal, followed directly by a period of silence, followed directly by the end of the file then the sequence may fit a pre-designed template of anomalies programmed into the system search mechanism. If the experienced sequence does fit the pre-designed template the system flows to box 70 where the audio recording is truncated truncate, preferably at the beginning of the slow busy signal and writes out a repaired wave file.

If the system fails to determine a fixable busy signal, the system flows to box 80, where the system determines the location of a fixable silence in the audio file. If the system locates a pre-determined sequence of silences the system flows to box 90 where the audio file is truncated at the appropriate location. If the system does not locate a fixable silence the system flows to box 100 to determine whether the presence of any busy signal anywhere in the file, or to determine the location a final silence in the audio file. In the event the system cannot locate an anomaly, typically where the anomaly does match a pre-determined set of criteria exactly, the system will return and error (box 110) notifying the user that the audio file cannot be fixed.

Figure 2:
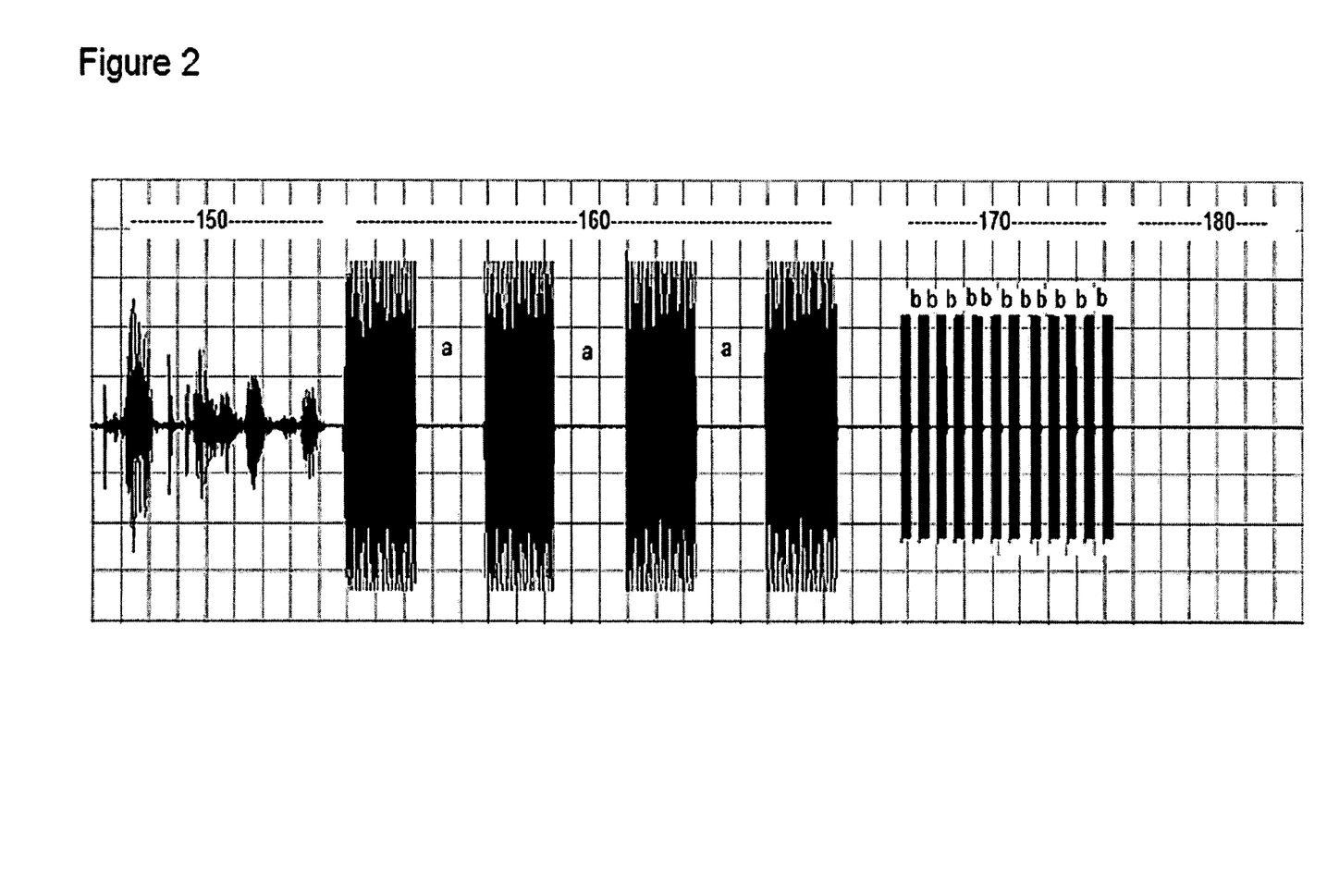
FIG. 2 is a diagram of the sample speech signals.

FIG. 2 is a representation of an exemplary audio recording where the horizontal axis is time going forward from left to right and the vertical axes shows amplitude of the sounds recorded. FIG. 2 is a linear representation of an audio recording where is time sample is a sample of the amplitude at a particular moment in time of the audio signal section 150 of the audio file is the speech signal. By way of example, 150 shows the location in the audio where the speaker is dictating a report. Section 160 may represent slow busy signal. Section 170 may represent fast busy signal. Section 180 may represent a final silence at the end of the audio file. In one embodiment of the present invention a search of the entire audio recording is conducted to determine the location and length of a series of silence samples. Inside each speech signal there can be found random patterns of noise and silence. As described above the present system may process the audio file to determine the location of strings of silence that are over a pre-determined minimum length. By way of example, FIG. 2 shows numerical representations 49 and 29, etc., which are the lengths of silences found in a particular audio recording. At section 160 there can be seen a definite pattern which may be identified as a slow busy signal. In the present example the lengths of recordings of 50 samples of silence followed by another 50 samples of silence may show that the strings of silence may be all nearly the same length, which are represented by the letter 'A'. The periods of silence labeled A are approximately 50 samples long. The system can be set to search for a pre-determined length of silences or having a range. In this connection, the system may be programmed to identify the fast or slow busy signals by having a repeater pattern of strings of silence that are of a certain pre-determined length within a certain range. Fast busy signals may be identified by searching for different lengths of silences. In the example shown in FIG. 2, the silence periods labeled B are 10 samples long. Given the length identified for section 170 it can be determined that section 170 is a fast busy section. Focusing on the end of the line at section 180 it can be seen that there exists a string of signals very near absolute silence, which location may be identified as the final silence period. Therefore, in this example the system may identify both the fast busy and the slow busy and the final silence sections of the recordings.

Figure 3:
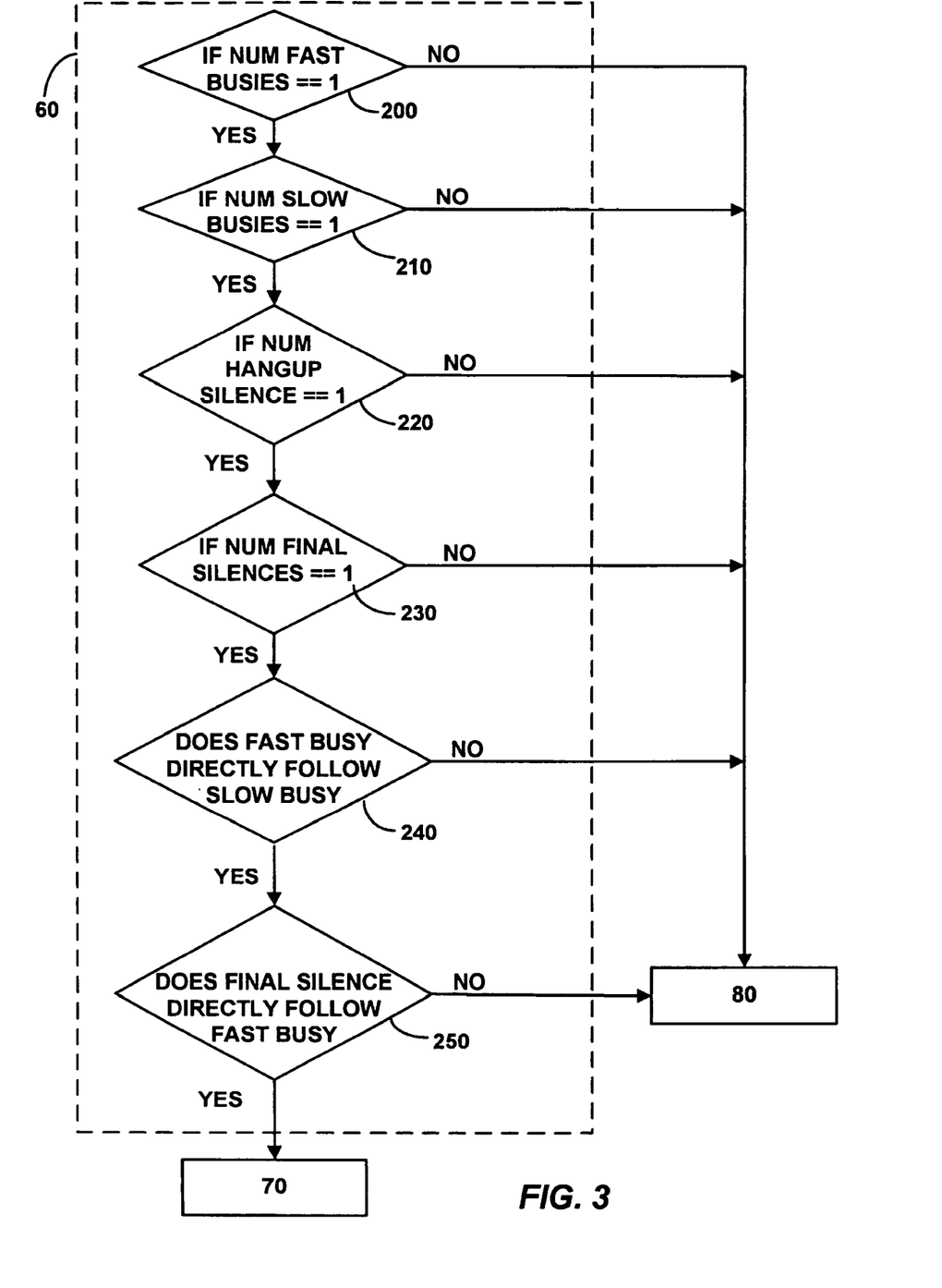
FIG. 3 shows the process steps of element 60 of FIG. 1 according to one embodiment of the present invention.
Figure 4:
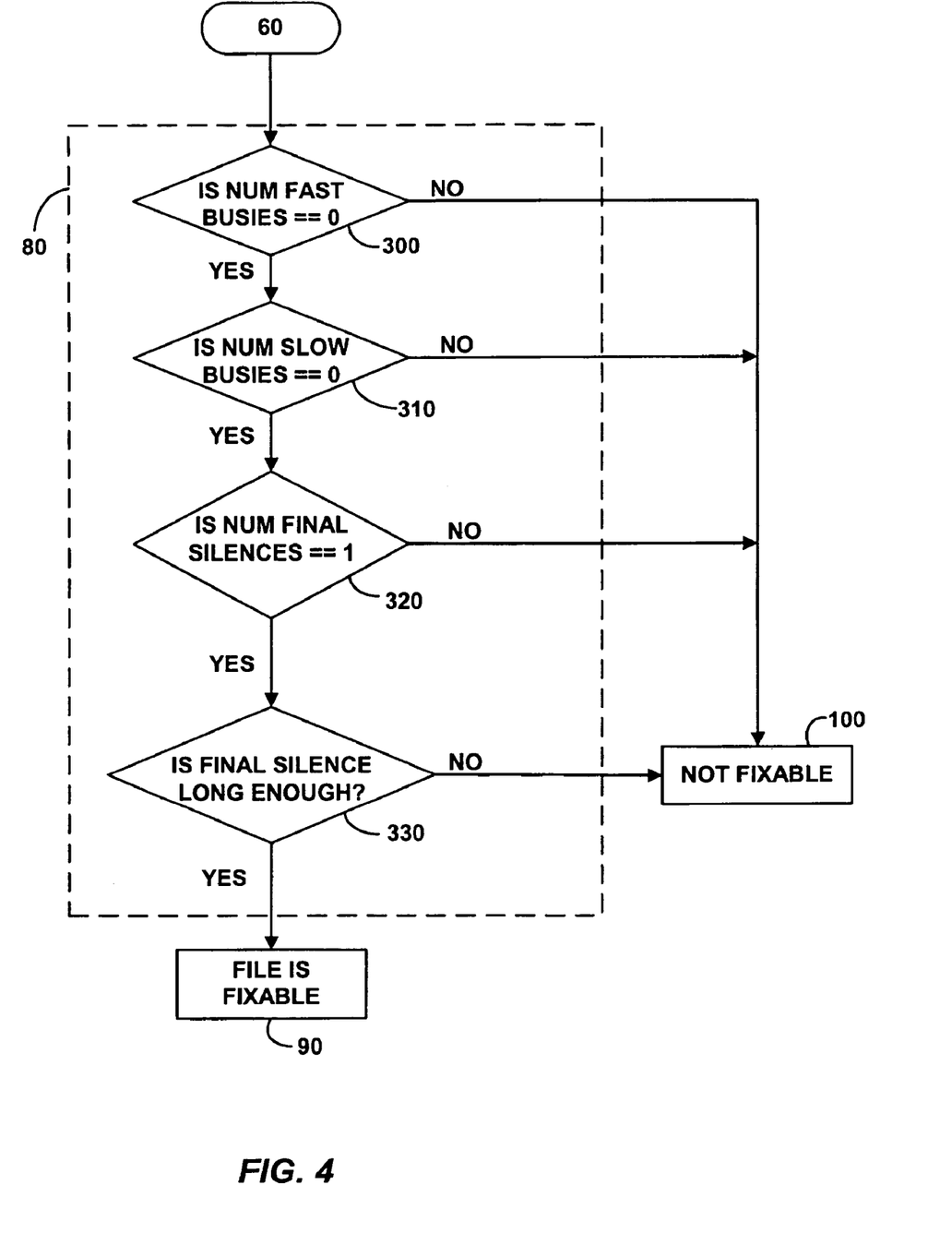
FIG. 4 shows the process steps of element 80 of FIG. 1 according to one embodiment of the present invention.

Turning now to FIG. 3, there is shown a detailed view of the process in box 60 according to FIG. 1. Within box 60 there are numerous steps to determine if an audio file is fixable with a busy signal. In box 200 there is determination of whether a number of fast busy signals equal to 1. If the number of fast busy signals is not equal to one, then the audio recording not fixable (box 80), else the system flows to box 210. In box 210 the system determines whether the slow busy signals is equal to 1. If the number of slow busy signals is not equal to one, then the audio recording not fixable (box 80), else the system flows to box 220. In box 220, the system determines whether the number of hang-up silences equals 1. If the number of hang-up signals is not equal to one, then the audio recording not fixable (box 80), else the system flows to box 230. In box 230, the system determines whether the number of final silences equal to 1. If the number of final silences is not equal to one, then the audio recording not fixable (box 80), else the system flows to box 240. In box 240, the system determines whether a fast busy directly follows slow busy. If a fast busy does not directly follow a slow busy, then the audio recording not fixable (box 80), else the system flows to box 250. In block 250, the system determines whether a final silence directly follows the fast busy signals. If a final silence does not directly follows the fast busy signals, then the audio recording not fixable (box 80), else the system flows to box 70 and the audio recording contains fixable busy signals, FIG. 4 shows the detailed processes of box 80 of FIG. 1. From box 60 the system flow in to box 80, where there are numerous steps in determining whether an audio recording contains a fixable silence. Beginning at box 300, the system determines whether the number of fast busies equal to zero. If the number of fast busies does not equal zero, the file is not fixable (box 100), else the system flows to box 310. In box 310, the system determines whether the number of slow busies equal to zero. If the number of slow busies does not equal zero, the file is not fixable (box 100), else the system flows to box 320. In box 320, the system determines whether the number of final silences equal to 1. If the number of final silences does not equal one, the file is not fixable (box 100), else the system flows to box 330. In box 330, the system determines whether the final silence equal to or larger than a pre-determined length. If the final silence is not equal to or larger than a pre-determined length, the file is not fixable (box 100), else the system flows to box 90. It is preferable that the final silence has to be over a certain minimum length.

Figure 5:
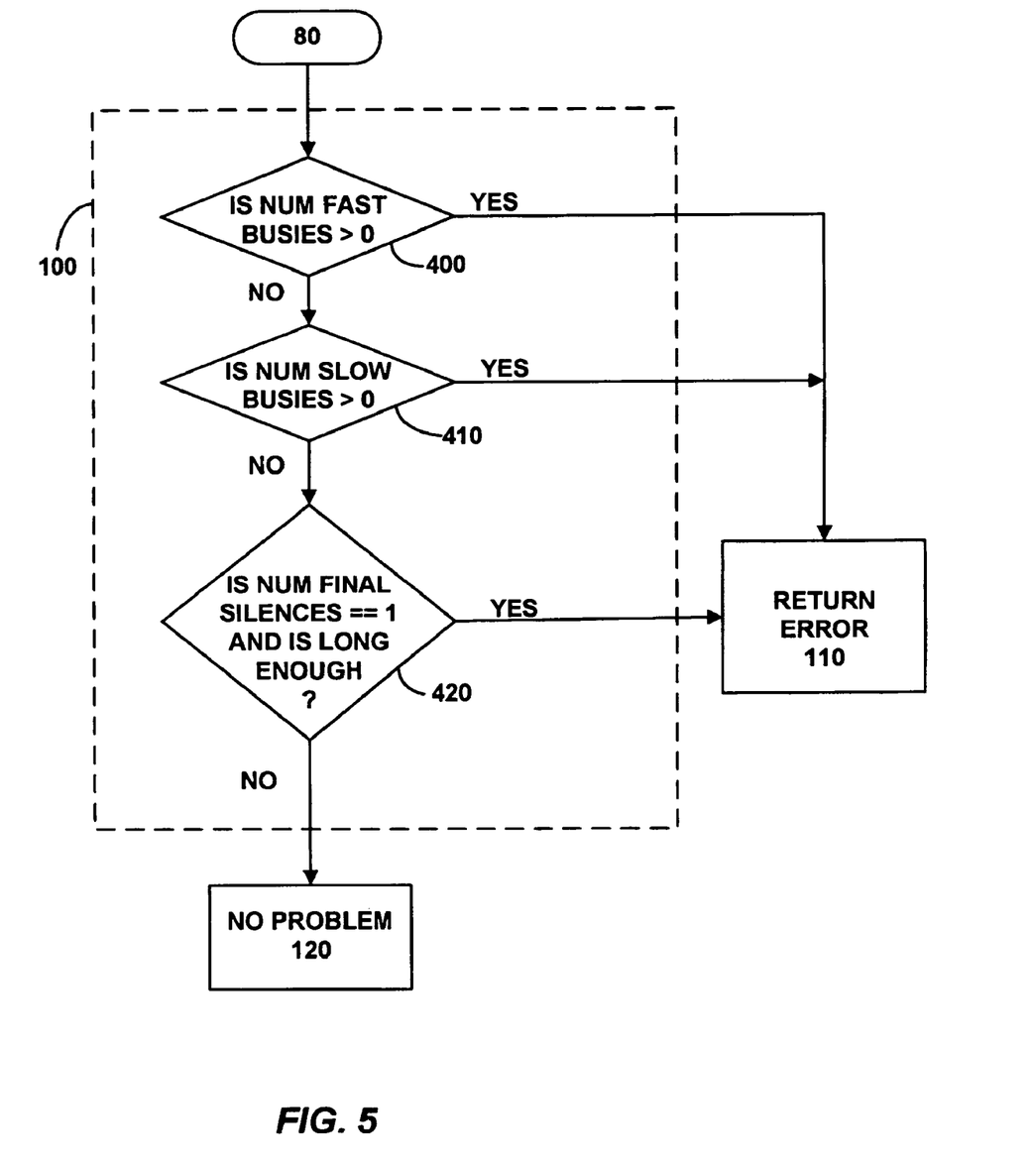
FIG. 5 shows the process steps of element 100 of FIG. 1 according to one embodiment of the present invention.

Referring to FIG. 5 there is shown a detailed process of box 100 in FIG. 1. From box 80 the system flows into box 100, via box 400, where there are numerous steps to determine whether the audio recording contains any other anomaly not already found. In box 400 the system determines whether the number of fast busy signals is greater than zero. If the number of fast busy signals is greater than zero, the system returns an error (box 110), else the system flows to box 410. In box 410 the system determines whether the number of slow busy signals is file greater than zero. If the number of slow busy signals is greater than zero, the system returns an error (box 110), else the system flows to box 420. In box 420, the system determines whether the number of final silences equals one and whether the final silence is equal to or greater than a pre-determined length. If the system determines that the number of final silences equals one and that the final silence is equal to or greater than a pre-determined length, there is problem with the audio recording and an error will be returned (box 110). If the system determines that the number of final silences does not equals one or that the final silence is not equal to or greater than a predetermined length, then there is no problem with the audio file. The system will then verify (box 120) that the present audio file is a good recording.

Figure 6:
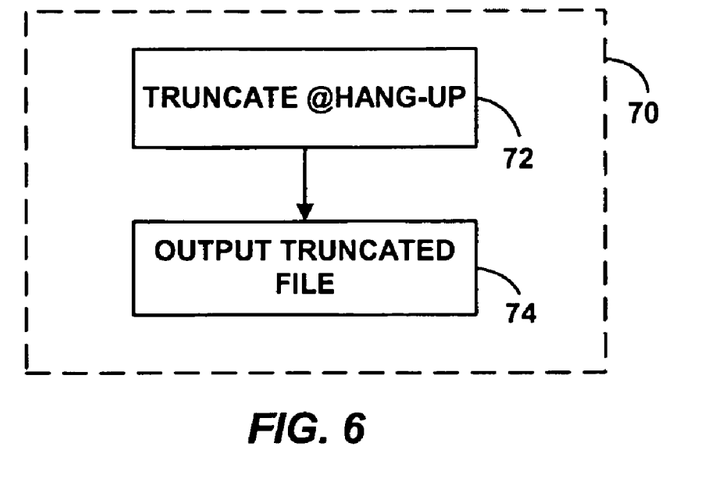
FIG. 6 shows the process steps of element 70 of FIG. 1 according to one embodiment of the present invention.
Figure 7:
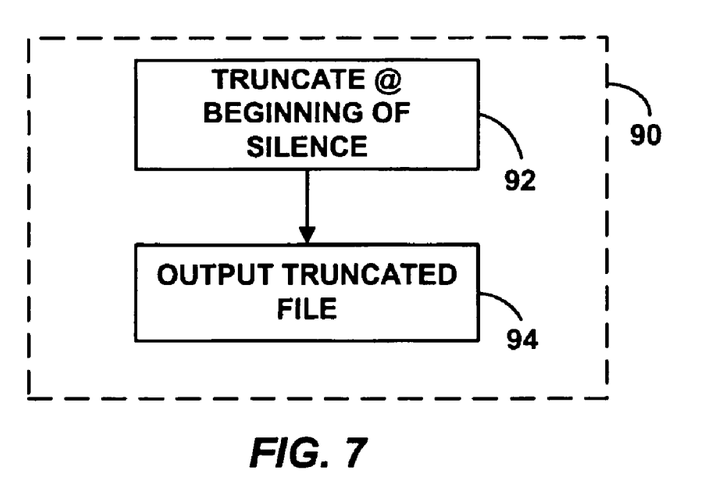
FIG. 7 shows the process steps of element 90 of FIG. 1 according to one embodiment of the present invention.
Figure 8:
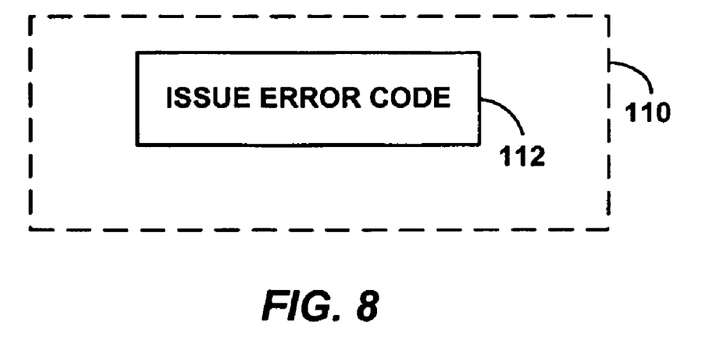
FIG. 8 shows the process steps of element 110 of FIG. 1 according to one embodiment of the present invention.

FIG. 6 shows more detail for the fix busy box 70 from FIG. 1. Box 70 contains box 72 showing the truncating step at the hang-up point and that flows into the output truncated file box 74. FIG. 7 is representative of the fixed silence box 90 from FIG. 1. Within FIG. 7 there is box 90 having internal details of box 90, where box 92 which includes truncating at the beginning of the silence and that flows into output truncated file box 94. FIG. 8 is representative of the return arrow box 110 on FIG. 1. FIG. 8 includes box 110 which also includes a box interior to box 110 at named box 112 which is an issue of an error code.

Figure 9A:
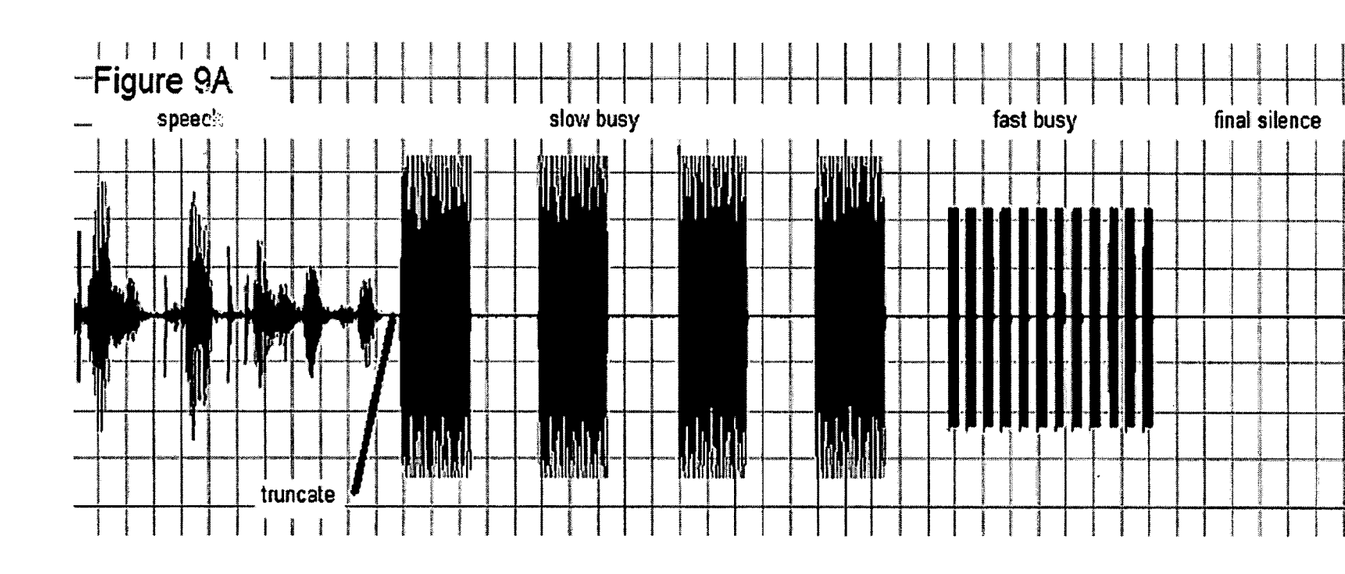
FIGS. 9A-9D shows illustrations of signals from selected audio recordings.
Figure 9B:
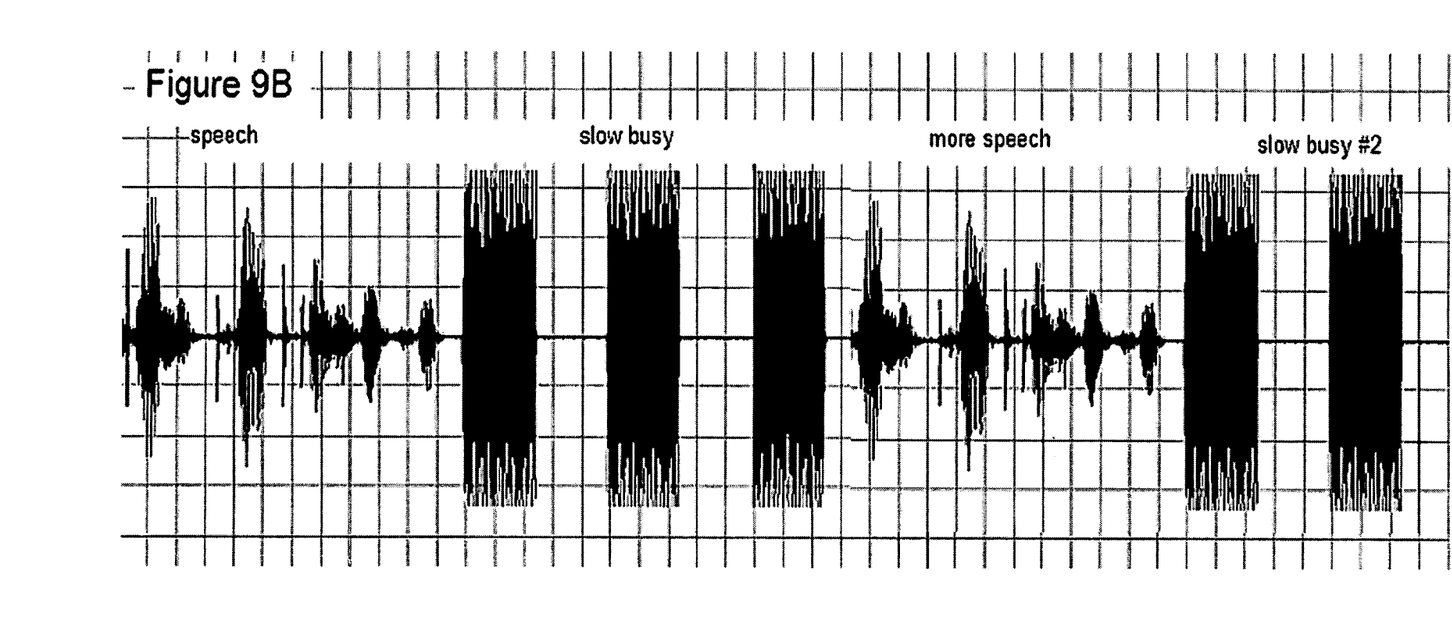
Figure 9C:
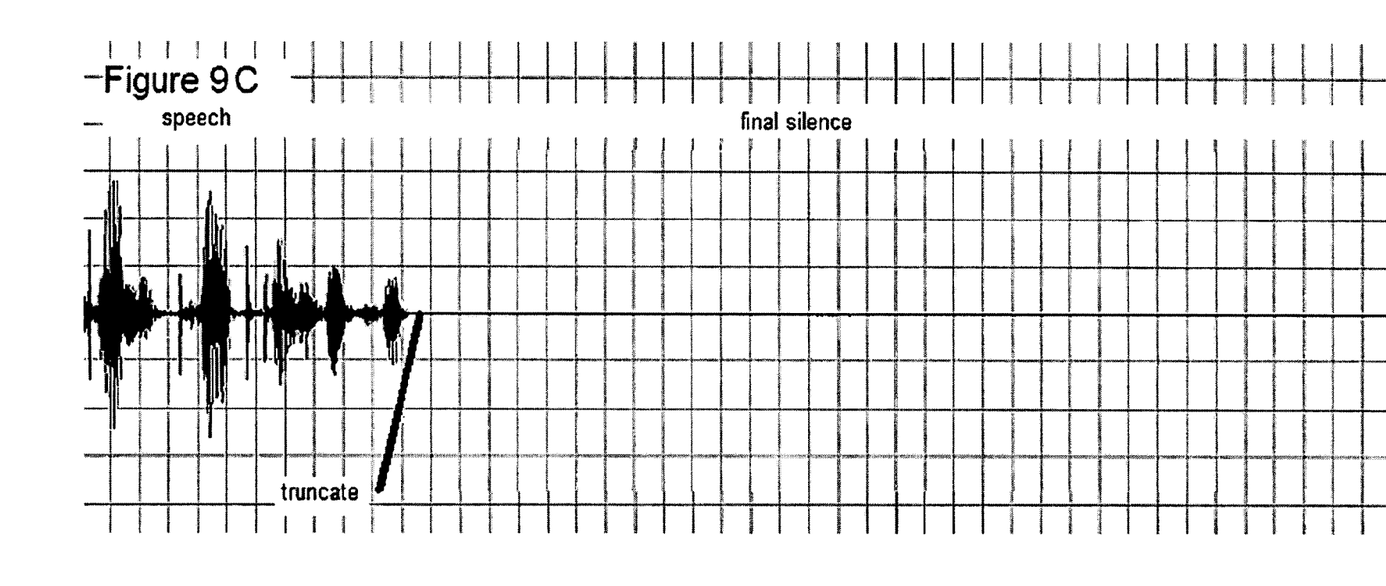
Figure 9D:
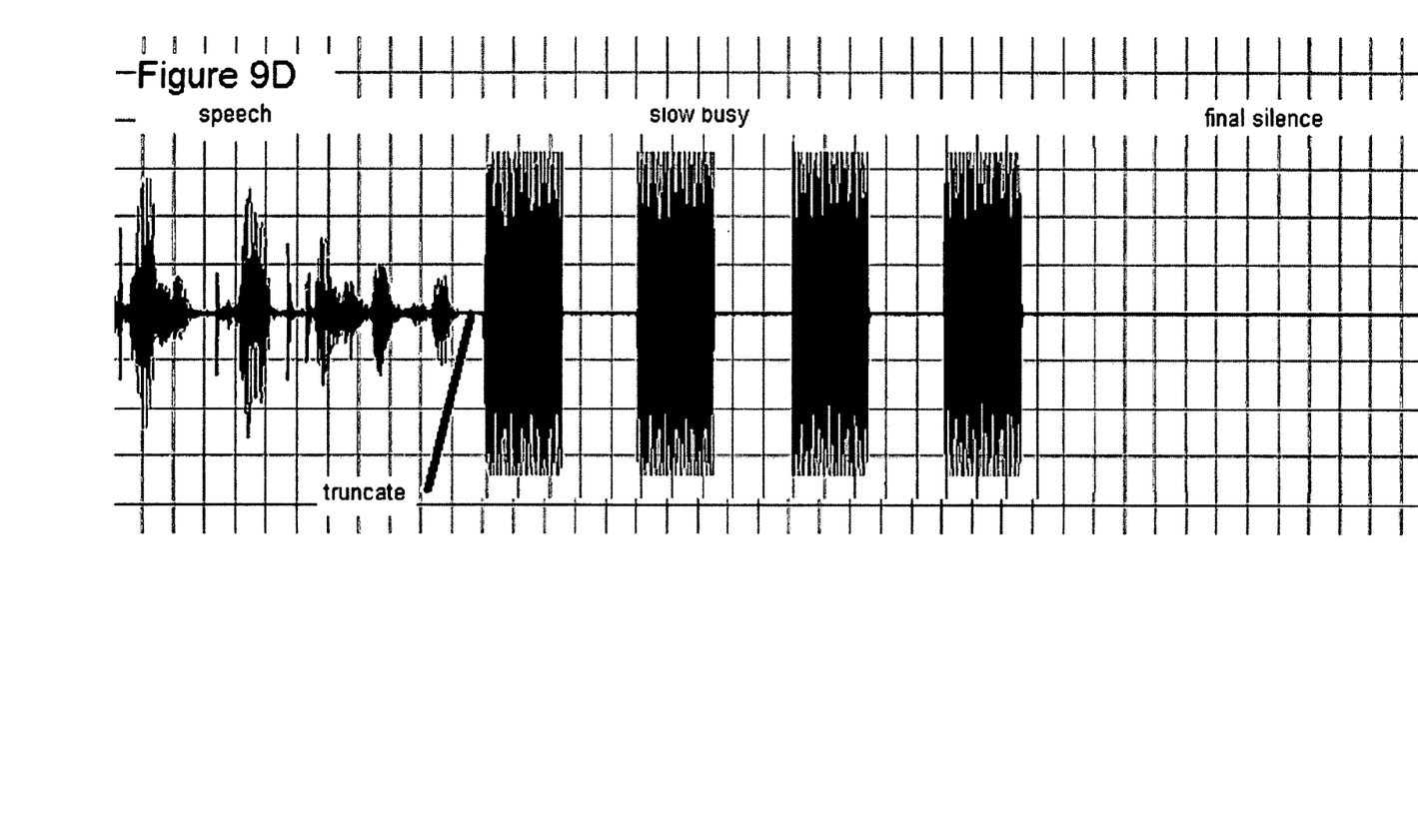

Referring now to FIGS. 9A-9D, there is shown a series of exemplary audio recordings represented in a linear fashion. FIG. 9A shows a well behaved recording that has a speech signal followed by a slow busy, followed by a fast busy, followed by a final silence. FIG. 9B shows an example of a not so well behaved signal. There is shown a speech signal followed by a slow busy signal, then some more speech, then another slow busy signal. This is an example of file that will likely not be identified as a fixable file but instead this example will fall into the category that has a problem cannot be fixed. This audio file contains has a problem that cannot be fixed because it is not well behaved, therefore the system will identify it as such and return an error code. In FIG. 9C there is shown another well behaved file of the form where speech is followed only by final silence. This audio file will be able to be fixed by truncating the file at the beginning of the final silence. In FIG. 9D there is shown is another not so well behaved file where speech is followed by a fast busy, followed by a final silence. There is no slow busy signal represented in this audio file. As such the present system will identify this audio file as missing the slow busy all together without a location to truncate necessitating the return of an error code.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

What is claimed is:

1. A method for repairing an audio recording comprising the steps of:
   i. inputting said audio recording into a computer apparatus operatively configured to:
   ii. examine said audio recording and determine periods of time corresponding to cluster of substantial silence within said audio recording;
   iii. characterize said clusters of substantial silence as fast busy signal, slow busy signal, hang-up silence, and final silence waveform patterns by comparing to a pre-determined waveform pattern of fast busy signals, slow busy signals, hang-up silences, and final silences;
   iv. identify the location of an anomaly point of the waveform pattern in the audio recording and truncate said recording from said anomaly point; and
   v. outputting said audio recording from said computer apparatus.

2. A method, in accordance with claim 1, further comprising returning an error indication when said waveform pattern does not correlate with said pre-determined waveform pattern.

3. A method, in accordance with claim 1, wherein location of said hang-up silence is determined by subtracting the length of the detected busy signal from the location of the first inter-busy signal.

4. A method, in accordance with claim 1, wherein said examining said audio recording comprises analyzing said audio recording amplitude and searching for strings or series of amplitudes that are very near to zero.

5. A method, in accordance to claim 4, wherein said search for strings or series of amplitudes that are very near to zero, precludes said strings or series of amplitudes having durations falling outside pre-determined minimum and maximum lengths.

6. A method, in accordance with claim 1, wherein said fast and slow busy signals are characterized as a regular series of silences.

\* \* \* \* \*